United States Patent Office 3,093,297
Patented June 11, 1963

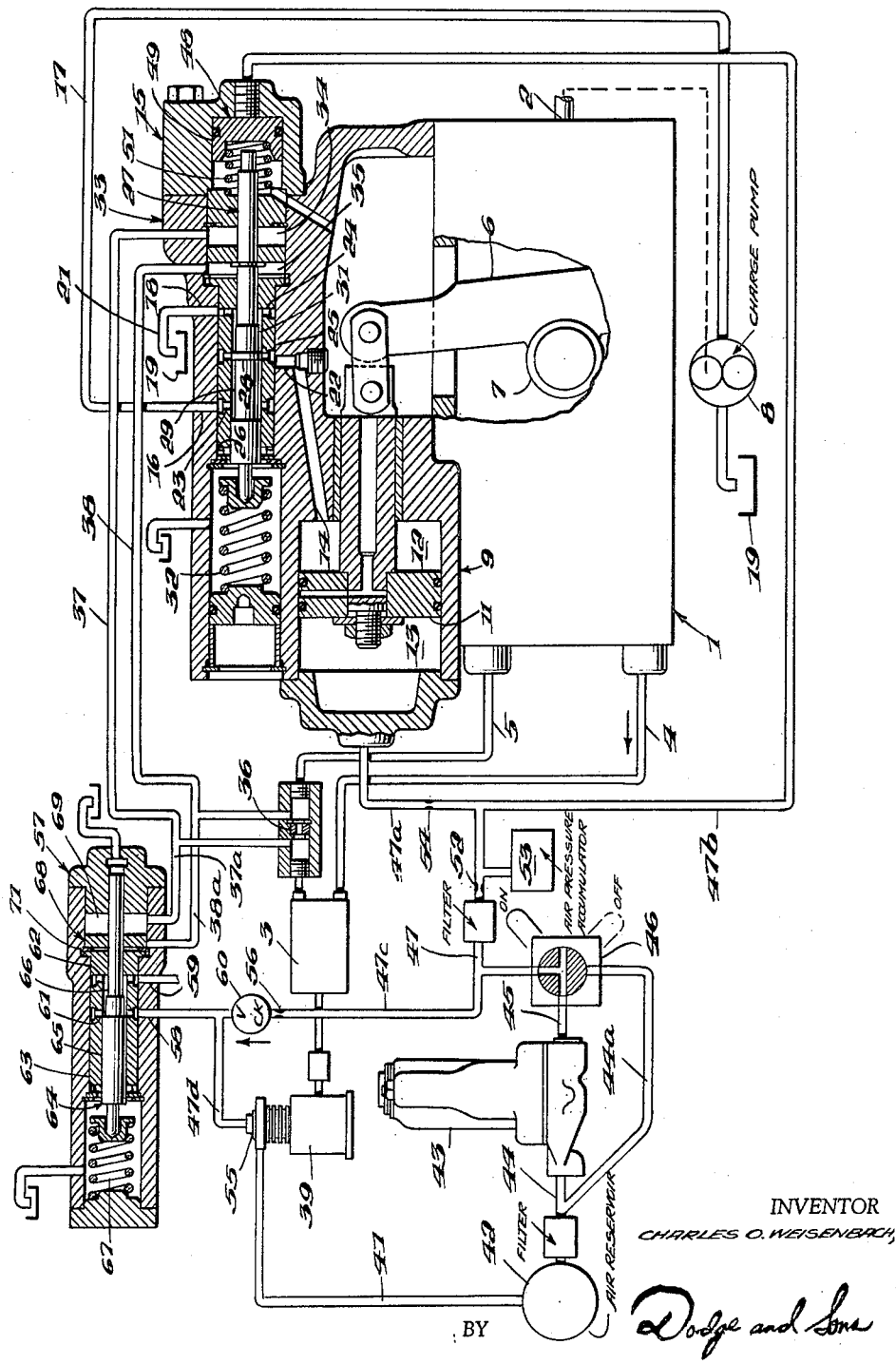

3,093,297
HYDROSTATIC TRANSMISSION
Charles O. Weisenbach, Watertown, N.Y., assignor to The
New York Air Brake Company, a corporation of New
Jersey
Filed Sept. 25, 1961, Ser. No. 140,328
19 Claims. (Cl. 230—4)

This invention relates to a hydrostatic drive for an air compressor. Since the invention has particular utility when used to drive a locomotive air compressor, it will be described in relation to this environment.

In the past, the air compressor on a locomotive has been coupled directly to the generator shaft which in turn is driven by the diesel engine. No clutch or other means of disconnecting the compressor was provided. As a result, the compressor was driven at engine speed and ran continuously. This drive arrangement has created many problems for the railroad operating and maintenance personnel. The following are a few of the more serious problems:

(1) *Insufficient air supply during engine idling.*—This condition can arise in the yards when the train system is being charged with air, and on long downhill grades where a rather large amount of air is required for braking. In either case the engine could be operated at idling conditions but the demands on the compressor require a higher speed. In the case of charging, time limitations frequently necessitate operation of the engine at 50% to 75% of full speed.

(2) *Oversize compressors.*—In order to minimize the condition mentioned above, resort is had frequently to oversize compressors. This results in higher equipment cost and inefficient operation during the normal operating cycle.

(3) *High speed operation.*—On long high speed runs where a minimum of air is used for braking, the compressor operates a large part of the time pneumatically unloaded at high speed. Although the compressor is unloaded, as much as 12 horsepower is required to drive it. This is a total loss of power and results in unnecessary heating. The excessive heat causes the oil that escapes from the compressor into the air system to produce formations of gums and waxes that can cause malfunctions of the valves. Furthermore, the oil can form explosive mixtures, and in the past, these mixtures have exploded. Finally, the shocks produced by loading and unloading at high speed are obviously undesirable.

(4) *Compressor failure.*—Should the compressor fail during a run, there is no way in which it can be disconnected. Because of this, the compressor may completely destroy itself by the end of the trip.

The object of this invention is to provide a hydrostatic transmission for driving an air compressor, particularly a locomotive air compressor, that eliminates or at least minimizes the disadvantages of the prior drive discussed above. In its preferred form, the invention affords:

(1) Constant compressor speed independent of engine speed, (2) Automatic stopping of the compressor during periods of no air demand, (3) Starting and stopping of the compressor with a minimum of shock, and (4) An overriding manual control for stopping the compressor and maintaining it at rest for indefinite periods of time.

The preferred embodiment is described herein in connection with the accompanying drawing whose single FIGURE shows the transmision, in schematic form, employed to drive a locomotive air compressor.

Referring to the drawing, the hydrostatic transmission includes a variable displacement hydraulic pump 1 having a drive shaft 2 that is connected, preferably through a suitable speed change device, such as a gear train or chain drive (not shown), with the generator shaft (not shown), a fixed displacement hydraulic motor 3, and a pair of conduits 4 and 5. In this embodiment, both the pump and motor are of the rotary cylinder barrel longitudinally reciprocating piston type. The pump 1 employs a cam plate 6 that is supported by yokes (one shown at 7) and trunnions (not shown) for angular movement between zero and maximum displacement-establishing positions. The trunnion axis is so positioned that the forces exerted on the cam plate 6 by the pump pistons urge the cam plate toward zero displacement-establishing position. In its complete form, this transmission, like most others, includes a replenishing and cooling circuit (not illustrated) that is fed by charge pump 8 and serves to extract and cool a portion of the oil in the system defined by pump 1, motor 3 and conduits 4 and 5 while maintaining this system liquid-filled.

Cam plate 6 is positioned by a double-acting piston motor 9 having a piston 11 and opposed working chambers 12 and 13. Hydraulic oil is supplied to and exhausted from working chamber 12 through passage 14 and under the control of control valve 15. This valve includes a housing having an inlet port 16 connected with charge pump 8 via conduit 17, an exhaust port 18 connected with sump 19 via conduit 21, and an outlet port 22 that communicates with passage 14. The three ports 16, 18, and 22 communicate respectively with three longitudinally spaced sets of radial passages 23—25 formed in stationary valve sleeve 26. Communication between ports 16, 18, and 22 is controlled by a valve plunger 27 that is guided for sliding movement in sleeve 26 and carries a land 28 interposed between groove 29 and reduced diameter portion 31. Valve plunger 27 has a lap position (illustrated in the drawing) in which land 28 overlies passages 25, and thus isolates outlet port 22 from inlet and exhaust ports 16 and 18, respectively, a second or supply position to the right of the lap position in which groove 29 and radial passages 23 and 25 interconnect ports 16 and 22, and a third or exhaust position to the left of the lap position in which reduced diameter portion 31 and radial passages 24 and 25 interconnect ports 18 and 22. Plunger 27 is biased toward the supply position by a spring 32 and is moved in the opposite direction against this bias by a double-acting piston motor 33. The working chambers 34 and 35 of the motor 33 are connected with the transmission system at points upstream and downstream of metering orifice 36 by conduits 37 and 38, respectively. Since the pressure drop across orifice 36 is a function of the rate of flow in the transmission system, and consequently of the speed of motor 3, control valve 15 and double-acting motor 9 serve to maintain motor speed constant by regulating the position of cam plate 6.

Hydraulic motor 3 drives the air compressor 39 which, through conduit 41, charges the air reservoir 42. Reservoir pressure is transmitted to governor valve 43 through conduit 44 and this valve serves to exert a secondary controlling action on double-acting motor 9 and control valve 15. The governor valve 43, which may be a standard commercially available type "NS-16" compressor governor, responds to reservoir pressure to vent outlet conduit 45 when the reservoir pressure is below a predetermined value and to transmit air from the reservoir to conduit 45 when the reservoir is fully charged. In a typical case, venting occurs at a reservoir pressure of 125 p.s.i. or less when the govenor valve 43 is set to establish a maximum reservoir pressure of 140 p.s.i. Outlet conduit 45 is connected with the working chamber 13 of double-acting motor 9 through isolation valve 46, conduit 47 and branch conduit 47a. Isolation valve 46 is included in the circuit to bypass governor valve 43 and permit direct communication between conduit 45 and reservoir 42 through branch conduit 44a. As explained in more detail below, the isolation valve 46 allows the operator to stop the air compressor manually and maintain it at rest for an indefinite period of time.

Outlet conduit 45 also is connected with a piston motor 48 through a branch 47b of conduit 47. This motor 48 includes a piston 49 that is arranged to move into engagement with and shift plunger 27 of control valve 15 toward its third or exhaust position. Normally, piston 49 is maintained out of engagement with the valve plunger by a light spring 51. The space to the left of this piston is connected with the interior of the casing of pump 1 and this space in turn is connected with sump 19.

It will be observed that conduit 47 contains a choke or restriction 52 and is connected with an air pressure accumulator 53, and that branch conduit 47a contains a choke or restriction 54. The accumulator and the chokes are included to control the rate of air pressure build-up and decay in the motors 9 and 48. For a reason which will be apparent from the description of operation, the accumulator 53 and the chokes 52 and 54 are so selected that motor 48 is effective to shift valve plunger 27 to its exhaust position before the pressure in working chamber 13 is effective to cause motor 9 to move the cam plate 6 to zero displacement-establishing position.

The governor valve 43 acting through motors 9 and 48 automatically reduces the displacement of pump 1 to zero, and consequently stops motor 3 and compressor 39, when there is no demand for compressed air and reservoir 42 is fully charged, and automatically starts the motor 3 again when an air demand is imposed on the reservoir. Isolation valve 46 effects manual starting and stopping of the motor 3. In order to minimize shocks during starting and stopping, the invention provides mechanism for automatically unloading the compressor during the stopping operation before the motor 3 comes to rest, and for loading the compressor during starting after the motor has attained an intermediate operating speed. This mechanism includes a pressure responsive unloader 55 that, when vented and pressurized, respectively, pneumatically loads and unloads the compressor 39, and that is connected with the conduit 47 through a branch conduit 47c containing a choke or restriction 56. Branch conduit 47c also contains a check valve 60 that blocks reverse flow through the conduit and thus prevents venting of unloader 55 through governor valve 43. Venting of unloader 55 is accomplished by a vent valve 57 with which it is connected by branch conduit 47d. This valve 57 includes inlet and exhaust ports 58 and 59 that communicate with branch conduit 47d and the atmosphere, respectively, and register with two longitudinally spaced series of radial passages 61 and 62 formed in the stationary valve sleeve 63. Communication between ports 58 and 59 is controlled by a valve plunger 64 having a land 65 and a reduced diameter portion 66. The plunger 64 is biased to the right, toward a position in which land 65 interrupts communication between the ports 58 and 59, by a spring 67, and is shifted in the opposite direction to establish such communication through reduced diameter portion 66 by a double-acting piston motor 68. Branch conduits 37a and 38a connect the opposed working chambers 69 and 71 of motor 58 with the transmission system at points upstream and downstream, respectively, of the metering orifice 36. Motor 68 is designed to shift plunger 64 to the left against the bias of spring 67 to interconnect ports 58 and 59 when the speed of motor 3 is about one-half the constant operating speed established by control valve 15.

*Operation*

When the transmission is at rest, spring 32 of control valve 15 holds valve plunger 27 in its supply position, and spring 67 of vent valve 57 holds plunger 64 in a position in which land 65 isolates inlet port 58 from exhaust port 59. Let it be assumed that at this time isolation valve 46 is in "On" position, that governor valve 43 is venting conduit 45, that the air pressure trapped in branch conduits 47c and 47d is causing unloader 55 to unload the air compressor 39, and that cam plate 5 is in zero displacement-establishing position.

When the engine is started, charge pump 8 commences immediately to deliver oil under pressure to the working chamber 12 of double-acting motor 9 through a path comprising conduit 17, inlet port 16, radial passages 23, groove 29, radial passages 25, outlet port 22 and passage 14. The oil in this chamber acts upon the right face of piston 11 and causes motor 9 to commence moving cam plate 6 toward maximum displacement-establishing position. This movement of the cam plate 6 causes main pump 1 to circulate oil through the transmission system in the direction of the arrow on the drawing (i.e., pump 1 draws oil from conduit 5 and discharges it under pressure to conduit 4) and thereby drive motor 3 and air compressor 39. The rate of flow through the system, and, therefore, the speed of motor 3, is directly related to the angular position of cam plate 6 and the speed of pump 1. The pressure differential across metering orifice 36 (which also is a function of the flow rate in the system) is applied to double-acting motor 68 via conduits 37a and 38a, and, when the motor 3 reaches that intermediate speed (for example 400 r.p.m.) at which it is desired to load air compressor 39, the pressure differential is sufficient to cause motor 68 to shift valve plunger 64 to the position in which reduced diameter portion 66 interconnects inlet and exhaust ports 58 and 59. Unloader 55 is now vented and commences to pneumatically load the air compressor 39.

When the motor 3 reaches the desired operating speed, for example 800 r.p.m., the pressure differential across orifice 36 is sufficient to cause double-acting motor 33 to shift control valve plunger 27 to the lap position, wherein land 28 overlies radial passages 25 and interrupts flow from inlet port 16 to outlet port 22. Double-acting motor 9 is now hydraulically locked against movement to the right and cam plate 6 is held in its current position against the restoring forces of the pump pistons. If the speed of the driving engine increases, the accompanying change in rate of flow through the transmission system increases the pressure differential across orifice 36. As a result, double-acting motor 33 shifts valve plunger 27 to its third or exhaust position and oil is allowed to escape from working chamber 12 to sump 19 through passage 14, outlet port 22, radial passages 25, reduced diameter portion 31, radial passages 24, exhaust port 18 and conduit 21. The forces exerted by the pump pistons on cam plate 6 now move the cam plate toward the zero displacement-establishing position thereby reducing the displacement of the pump 1. Valve plunger 27 remains in its exhausting position, and cam plate 6 continues to move in a displacement-reducing direction until the displacement-increasing effect of the change in engine speed has been exactly offset and motor speed has stabilized at the desired value of 800 r.p.m. At this time the pressure differential across orifice 36 will have returned valve plunger 27 to the lap position. Cam plate 6 is now hydraulically locked in its new position. Further increases in engine speed are accompanied by similar movements of cam plate 6.

A decrease in engine speed reduces the rate of flow through the transmission system and causes double-acting motor 33 to allow spring 32 to move valve plunger 27 to its supply position. Motor 9 now moves cam plate 6 in the displacement-increasing direction. As in the previous case, the plunger 27 will be returned to its lap position and motor 9 will be hydraulically locked against movement to the right when the displacement-increasing effect produced by the change in the angle of cam plate 6 offsets the displacement-decreasing effect of the change in engine speed. It should be now be apparent that control valve 15 and motor 9 exert a primary control action on cam plate 6 that has the result of maintaining the speed of motor 3 constant.

When the demand for compressed air ceases, or reduces to such a low level that reservoir pressure rises to the fully charged value of 140 p.s.i., governor valve 43 operates to transmit air from the reservoir 42 to the outlet conduit 45.

A portion of this air flows to atmosphere through isolation valve 46, conduit 47, branch conduits 47c and 47d, inlet port 58, radial passages 61, reduced diameter portion 66, radial passages 62, and exhaust port 59, but, because of the presence of choke 56, a back pressure will be built up in conduit 47. Therefore, air in conduit 47 is forced through branch conduit 47b to piston motor 48 where it is effective to shift piston 49 into abutment with control valve plunger 27 and cause it to move the plunger to its exhaust position. Air under pressure also is forced through branch conduit 47a to working chamber 13, where, after a time delay determined by choke 54 that is sufficient to allow control valve plunger 27 to shift to its exhaust position, it is effective to cause double-acting motor 9 to move cam plate 6 to the zero displacement-establishing position. The moving force exerted by motor 9 is, of course, augmented by the forces exerted by the pump pistons on the cam plate. Since the control valve plunger 27 is in its exhaust position before piston 11 commences to move, the oil in working chamber 12 escapes freely to sump 19 along the path previously described.

Since branch conduit 47d is now vented to atmosphere through vent valve 57, the pressure in unloader 55 is insufficient to cause unloading of the compressor. However, when cam plate 6 reaches a position in which the flow rate through the transmission system no longer produces the pressure differential across orifice 36 required to enable double-acting motor 68 to hold plunger 64 in the illustrated vent position, plunger 64 shifts to the right and land 65 closes the vent path. The pressure in branch conduits 47c and 47d now rises and causes unloader 55 to pneumatically unload the compressor. In the example described herein, unloading occurs when motor 3 reaches a speed of 400 r.p.m. When the cam plate 6 reaches the zero displacement-establishing position and motor 3 comes to rest, the compressor 39 will already have been pneumatically unloaded. Therefore, an abrupt stop is avoided.

When reservoir pressure reduces below 125 p.s.i., governor valve 43 interrupts communication between conduits 44 and 45 and again vents conduit 45 to atmosphere. This causes a reduction in the pressure in piston motor 48 and permits spring 32 to move control valve plunger 27 to the right to its supply position. Simultaneously, the pressure in working chamber 13 of motor 9 decays with the result that the oil admitted to working chamber 12 is able to move piston 11 to the left and shift cam plate 6 away from the zero displacement-establishing position. The rates at which the pressures in motor 48 and in working chamber 13 decrease is determined by chokes 52 and 54 and accumulator 53, and these parts are so selected that abrupt movement of cam plate 6 is avoided. As the cam plate 6 moves in the displacement-increasing direction fluid is once again circulated in the transmission system and motor 3 is accelerated. Since the pressure in unloader 55 is trapped by check valve 60 and vent valve 57, the venting action of governor valve 43 does not cause loading of the compressor. As mentioned previously, the compressor is not pneumatically loaded until branch conduit 47d is vented, and this does not occur until the motor 3 attains a speed of 400 r.p.m. This delay in loading of the compressor 39 is an advantage because it minimizes the starting load imposed on the transmission.

The compressor 39 may be stopped manually by shifting isolation valve 46 to its "Off" position. This action connects reservoir 42 directly with conduit 47 through branch conduit 44a and thus effects shut-down in the same manner as when reservoir pressure is transmitted to conduit 47 through governor valve 43. In this case, however, the compressor remains at rest indefinitely, i.e., as long as isolation valve 46 is in the "Off" position. When isolation valve 46 is returned to its "On" position and branch conduit 44a is closed, conduits 47, 47a and 47b are vented through governor valve 43 and the transmission and the compressor are started in the same manner as when shutdown occurred automatically.

As stated previously, the drawing and description relate only to the preferred embodiment of the invention. Since many changes can be made in the structure of this embodiment without departing from the inventive concept, the following claims should provide the sole measure of the scope of the invention.

What I claim is:

1. In combination, a hydrostatic transmission including a pump and a motor; an air compressor system including an air compressor connected in driven relation with the motor and a reservoir connected with the compressor for receiving and storing compressed air; first means connected with the hydrostatic transmission for maintaining motor speed at a constant predetermined value; and second means responsive to reservoir pressure for overriding the first means and reducing motor speed when reservoir pressure exceeds a predetermined value.

2. The combination defined in claim 1 including an unloader for the air compressor; and actuating means connected with the unloader and the second means for causing the unloader to unload the compressor as motor speed is reduced under the action of the second means.

3. The combination defined in claim 1 including manually operable override means connected with the first means for reducing motor speed.

4. The combination defined in claim 1 including manually operable override means connected with the first means for reducing motor speed; an unloader for the air compressor; and actuating means connected with the unloader and both the second means and the manually operable override means for causing the unloader to unload the compressor as motor speed is reduced under the action of either the second means or the manually operable override means.

5. In combination, a hydrostatic transmission including a motor and a variable displacement pump; displacement control means connected with the pump; control means connected with the displacement control means and responsive to the speed of the motor to maintain motor speed constant by varying pump displacement; an air compressor driven by the motor; a reservoir connected with the compressor for receiving and storing compressed air; and overriding means responsive to reservoir pressure and connected with the displacement control means for overriding the speed control means and causing the pump to operate at minimum displacement when reservoir pressure exceeds a predetermined value.

6. The combination defined in claim 5 including an unloader for the air compressor; and actuating means connected with the unloader and the pressure responsive overriding means for causing the unloader to unload the compressor as motor speed is reduced under the action of the overriding means.

7. The combination defined in claim 5 including manually operable override means connected with the displacement control means for overriding the control means and causing the pump to operate at minimum displacement.

8. The combination defined in claim 5 including manually operable overriding means connected with the displacement control means for overriding the control means and causing the pump to operate at minimum displacement; an unloader for the air compressor; and actuating means connected with the unloader and both the pressure responsive and manually operable overriding means for causing the unloader to unload the compressor as pump displacement is reduced under the action of either the pressure responsive overriding means or the manually operable overriding means.

9. In combination, a hydraulic motor; a variable displacement hydraulic pump having a control element shiftable between minimum and maximum displacement-establishing positions; conduits connecting the pump and motor in a closed circuit; means biasing the control element toward its minimum displacement-establishing position; a first fluid pressure motor having a working chamber and a movable element subject to the pressure in that chamber and connected with the control element for moving the latter toward its maximum displacement-establishing position; a sump and a source of hydraulic pressure; a control valve having an inlet passage connected with the source, an outlet passage connected with the working chamber, an exhaust passage connected with the sump and a movable valve member shiftable between first and second positions in which it connects the outlet passage with the inlet and exhaust passages, respectively, and an intermediate lap position in which it isolates the outlet passage from the other passages; means biasing the movable valve member toward the first position; means responsive to the rate of flow through the closed circuit for shifting the movable valve member toward the second position with a force that varies directly with the rate of flow in the closed circuit; an air compressor connected in driven relation with the hydraulic motor; a reservoir connected with the air compressor for receiving and storing compressed air; a second fluid pressure motor having a working chamber and a movable element subject to the pressure in that chamber and connected with the control element for moving it in opposition to the first motor; pressure responsive means connected with the movable member of the control valve for shifting it toward the second position; and valve means responsive to reservoir pressure for venting the second fluid pressure motor and the pressure responsive means when reservoir pressure is below a predetermined value and for transmitting reservoir pressure to the second motor and pressure responsive means when the reservoir is fully charged.

10. The combination defined in claim 9 including an unloader for the air compressor; pressure responsive actuating means connected with the unloader, said actuating means serving when pressurized to cause the unloader to unload the compressor; means including the valve means for transmitting reservoir pressure to the actuating means when the reservoir is fully charged; and means controlled by the speed of the hydraulic motor for venting the actuating means when motor speed exceeds a certain value.

11. The combination defined in claim 9 including a bypass passage connecting the second fluid pressure motor and the pressure responsive means with the reservoir; and a manually operable valve connected with the valve means and the bypass passage and shiftable between a first position in which the bypass passage is closed and the valve means is connected with the second fluid pressure motor and the pressure responsive means, and a second position in which the bypass passage is open and the valve means is isolated from the second fluid pressure motor and the pressure responsive means.

12. The combination defined in claim 9 including a bypass passage connected with the reservoir; a manually operable valve having first and second inlet passages connected, respectively, with the valve means and the bypass passage, an outlet passage connected with the second fluid pressure motor and the pressure responsive means, and a movable member shiftable between first and second positions in which the outlet passage is connected with the first and second inlet passages, respectively; an unloader for the air compressor; actuating means connected with the unloader, said actuating means serving when pressurized to cause the unloader to unload the compressor and when vented to cause the unloader to load the compressor; restricted passage means connecting the actuating means with the outlet passage of the manually operable valve; and means controlled by the speed of the hydraulic motor for venting the actuating means when motor speed exceeds a certain value.

13. In combination, a hydraulic motor; a variable displacement hydraulic pump having a control element shiftable between minimum and maximum displacement-establishing positions; conduits connecting the pump and motor in a closed circuit; means biasing the control element toward its minimum displacement-establishing position; a first fluid pressure motor having a working chamber and a movable element subject to the pressure in that chamber and connected with the control element for moving the latter toward its maximum displacement-establishing position; a sump and a source of hydraulic pressure; a control valve having an inlet passage connected with the source, an outlet passage connected with the working chamber, an exhaust passage connected with the sump, and a movable valve element shiftable between first and second positions in which it connects the outlet passage with the inlet passage and the exhaust passage, respectively, and an intermediate lap position in which it isolates the outlet passage from the other passages; means biasing the movable valve member toward the first position; a metering orifice located in the closed circuit; a double-acting piston motor connected with the movable valve member, one side of the double-acting motor being connected with the closed circuit at a point upstream of the metering orifice and being arranged to shift the movable valve member toward the second position and the other side of the double-acting motor being connected with the closed circuit at a point downstream of the metering orifice; an air compressor connected in driven relation with the hydraulic motor; a reservoir connected with the air compressor for receiving and storing compressed air; a second fluid pressure motor having a working chamber and a movable element subject to the pressure in that chamber and connected with the control element for moving it in opposition to the first fluid pressure motor; a third fluid pressure motor having a working chamber and a movable element subject to the pressure in that chamber and arranged to shift the movable valve member toward its second position; a pressure responsive governor valve having an inlet passage connected with the reservoir and an outlet passage and serving to vent the outlet passage when reservoir pressure is above a certain value and to transmit reservoir pressure to the outlet passage when that pressure is below a predetermined value; first conduit means connecting the outlet passage of the governor valve with the second and third fluid pressure motors; and means connected with the first conduit means for retarding the transmission of pressure to and from the second fluid pressure motor in relation to the transmission of pressure to and from the third fluid pressure motor.

14. The combination defined in claim 13 including an unloader for the air compressor; pressure responsive actuating means connected with the unloader, said means serving when pressurized to cause the unloader to unload the compressor; second conduit means connecting the pressure responsive actuating means with the outlet passage of the governor valve; and means connected with the second conduit means for retarding the transmission of pressure to and from the actuating means in relation to the transmission of pressure to and from the second fluid pressure motor.

15. The combination defined in claim 14 in which the means for retarding the transmission of pressure to and from the actuating means includes a flow restriction located in the second conduit means; a check valve located in the second conduit means and arranged to prevent flow toward the outlet passage of the governor valve; a vent passage connected with the actuating means; a vent valve normally closing the vent passage; and means responsive to the speed of the hydraulic motor for opening the vent valve when motor speed exceeds a certain value.

16. The combination defined in claim 15 in which the first conduit means includes first and second conduits connecting the outlet passage of the governor valve with the second and third fluid pressure motors, respectively; and in which the means for retarding the transmission of pressure to and from the second fluid pressure motor comprises a flow restriction located in the first conduit and a pressure accumulator connected with the outlet passage of the governor valve.

17. The combination defined in claim 13 including a bypass passage connected with the reservoir; and a manually operable valve connected with the bypass passage, the outlet passage of the governor valve and the first conduit means and shiftable between the first position which the outlet passage is connected with the first conduit means and the bypass passage is closed and a second position in which the bypass passage is connected with the first conduit means and the outlet passage is closed.

18. The combination defined in claim 17 including an unloader for the air compressor; pressure responsive actuating means connected with the unloader, said actuating means serving when pressurized to cause the unloader to unload the compressor and when vented to cause the unloader to load the compressor; second conduit means connecting the pressure responsive actuating means with the first conduit means, said second conduit means containing a flow restriction and a check valve arranged to prevent flow from the second to the first conduit means; a vent passage connected with the pressure responsive actuating means; a vent valve normally closing the vent passage; and valve shifting means responsive to the speed of the hydraulic motor for opening the vent valve when motor speed exceeds a certain value.

19. The combination defined in claim 18, in which the shifting means comprises a spring biasing the vent valve closed; and a double-acting fluid pressure motor for shifting the vent valve to open position, the opposite sides of the double-acting motor being connected with the closed circuit at points upstream and downstream, respectively, of the metering orifice.

References Cited in the file of this patent

UNITED STATES PATENTS

| | | |
|---|---|---|
| 887,252 | Jackson | May 12, 1908 |
| 1,709,871 | Parke | Apr. 23, 1929 |
| 1,786,367 | Sanford | Dec. 23, 1930 |
| 2,115,888 | Staley | May 3, 1938 |
| 2,212,631 | Baker | Aug. 27, 1940 |
| 2,941,365 | Carlson et al. | June 21, 1960 |

FOREIGN PATENTS

| | | |
|---|---|---|
| 575,204 | Canada | May 5, 1959 |